United States Patent
Forsberg et al.

(10) Patent No.: US 11,536,181 B2
(45) Date of Patent: Dec. 27, 2022

(54) CONTROLLING AN EXHAUST GAS AFTERTREATMENT SYSTEM

(71) Applicant: VOLVO TRUCK CORPORATION, Gothenburg (SE)

(72) Inventors: Mikael Forsberg, Gothenburg (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/297,901

(22) PCT Filed: Dec. 11, 2018

(86) PCT No.: PCT/EP2018/084332
§ 371 (c)(1),
(2) Date: May 27, 2021

(87) PCT Pub. No.: WO2020/119888
PCT Pub. Date: Jun. 18, 2020

(65) Prior Publication Data
US 2022/0042442 A1 Feb. 10, 2022

(51) Int. Cl.
*F01N 9/00* (2006.01)
*F01N 3/20* (2006.01)
(Continued)

(52) U.S. Cl.
CPC ............ *F01N 9/00* (2013.01); *F01N 3/208* (2013.01); *F01N 3/2066* (2013.01); *F02B 37/18* (2013.01);
(Continued)

(58) Field of Classification Search
CPC .......... F01N 9/00; F01N 3/2066; F01N 3/208; F01N 2610/02; F01N 2900/10; F01N 2900/12; F01N 2900/1602; F02B 37/18; F02D 41/0007; F02D 41/0047; F02D 41/0245; F02D 41/04; F02D 41/005; F02D 2200/0804; F02D 2200/501; F02D 2200/70; F02D 2200/702
See application file for complete search history.

(56) References Cited

U.S. PATENT DOCUMENTS

2005/0166580 A1    8/2005    Pfaeffle et al.
2010/0043404 A1    2/2010    Hebbale et al.
(Continued)

FOREIGN PATENT DOCUMENTS

DE    102015220182 A1    8/2016
WO    2016200320 A1    12/2016

OTHER PUBLICATIONS

International Search Report and Written Opinion dated Aug. 19, 2019 in corresponding International PCT Application No. PCT/EP2018/084332, 12 pages.

*Primary Examiner* — Audrey B. Walter
(74) *Attorney, Agent, or Firm* — Venable LLP; Jeffri A. Kaminski

(57) ABSTRACT

The present disclosure generally relates to a computer implemented method for controlling an exhaust gas aftertreatment system (EATS), specifically applying a scheme for preventing heat reduction at the EATS based on the estimated heat reduction. The present disclosure also relates to a corresponding exhaust gas aftertreatment system (EATS) and a computer program product.

15 Claims, 4 Drawing Sheets

(51) Int. Cl.
    *F02B 37/18*     (2006.01)
    *F02D 41/00*     (2006.01)
    *F02D 41/02*     (2006.01)
    *F02D 41/04*     (2006.01)

(52) U.S. Cl.
    CPC ..... *F02D 41/0007* (2013.01); *F02D 41/0047* (2013.01); *F02D 41/0245* (2013.01); *F02D 41/04* (2013.01); *F01N 2610/02* (2013.01); *F01N 2900/10* (2013.01); *F01N 2900/12* (2013.01); *F01N 2900/1602* (2013.01); *F02D 41/005* (2013.01); *F02D 2200/0804* (2013.01); *F02D 2200/501* (2013.01); *F02D 2200/70* (2013.01); *F02D 2200/702* (2013.01)

(56) References Cited

U.S. PATENT DOCUMENTS

| | | | |
|---|---|---|---|
| 2014/0074386 A1 | 3/2014 | McGee et al. | |
| 2017/0030243 A1 | 2/2017 | Li et al. | |
| 2017/0130635 A1* | 5/2017 | Smith | B60K 6/24 |
| 2017/0211493 A1 | 7/2017 | Kidd et al. | |
| 2018/0149059 A1* | 5/2018 | Fröberg | F02D 41/0235 |

* cited by examiner

CONTROLLING AN EXHAUST GAS AFTERTREATMENT SYSTEM

CROSS-REFERENCE TO RELATED APPLICATIONS

This application is a U.S. National Stage application of PCT/EP2018/084332, filed Dec. 11, 2018, and published on Jun. 18, 2020 as WO 2020/119888 A1, all of which is hereby incorporated by reference in its entirety.

TECHNICAL FIELD

The present disclosure generally relates to a computer implemented method for controlling an exhaust gas aftertreatment system (EATS), specifically applying a scheme for preventing heat reduction at the EATS based on the estimated heat reduction. The present disclosure also relates to a corresponding exhaust gas aftertreatment system (EATS) and a computer program product.

BACKGROUND

There is an ongoing development for reducing emissions in a vehicle, such as a truck, comprising a combustion engine. Current legal emission requirements generally dictate emission control, such that exhaust gas aftertreatment systems (EATS) are necessary. Usually, such an EATS comprises an oxidation catalyst for oxidizing nitrogen monoxide (NO) to nitrogen dioxide (NO2), a particulate filter and a unit for reducing nitrogen oxides (NOx) emissions.

The EATS functions as soon as exhaust gas temperatures are around 200°-250° deg. C. However, it is not possible to always ensure that the exhaust gas temperatures are kept at the desired temperature. For example, the exhaust gas temperatures will fall quickly if the vehicle is brought to a stop at a traffic signal or if the vehicle is parked. Detrimental effects to partial or aborted regeneration events include wasted fuel in the initiation of the regeneration event, uncleaned or partially-cleaned aftertreatment devices, or damage to the aftertreatment device.

A proposed solution to this problem is presented in US20100043404, making use of map data acquired from a digital map device for providing a predicted vehicle operating condition through a travel route. Operation of the aftertreatment device is controlled based upon the predicted exhaust gas temperature profile, using active systems in order to reach the necessary exhaust gas temperatures when predicted vehicle operating conditions indicates a lowered exhaust gas temperature.

Even though US20100043404 improves the overall operation of the vehicle's aftertreatment device, there appears to be room for further improvements, specifically taking into account what type of means to apply for ensuring efficient operation of the vehicle.

SUMMARY

In accordance to an aspect of the present disclosure, the above is at least partly alleviated by means of a computer implemented method for controlling an exhaust gas aftertreatment system (EATS) coupled downstream of an internal combustion engine comprised with a vehicle, the vehicle further arranged in communication with a control unit, wherein the method comprises the steps of receiving, at the control unit, an indication of an upcoming reduction of an average speed for the vehicle, determining, at the control unit and if the upcoming reduction of the average speed is above a predetermined speed threshold, an estimated heat reduction at the EATS based on the upcoming reduction of the average speed, selecting, at the control unit, a scheme for preventing heat reduction at the EATS based on the estimated heat reduction, and activating, at the control unit and if the estimated heat reduction is above a predetermined heat threshold, the selected scheme, wherein the selected scheme for preventing heat reduction at the EATS is arranged to be essentially fuel consumption neutral.

The present disclosure is based on the understanding that while it is necessary to maintain the exhaust gas temperature at a desirable level for ensuring that the EATS functions properly, it is desirable to ensure that such requirements are met without increasing the fuel consumption of the vehicle. Conversely, the heat maintenance actions suggested in accordance to prior art for keeping the exhaust gas temperature at the desirable level generally require additional energy (heat) which is ultimately generated from the fuel (e.g., electrical energy from the battery to generate heat in a heating element, a fuel burner, post-injection of fuel into the engine combustion chamber). The exhaust emission control system according to the presented prior art thus increases the fuel consumption of the vehicle.

In line with the present disclosure, keeping the exhaust gas temperature at a desirable level is accomplished by selecting a scheme for preventing heat reduction at the EATS that matches an estimated heat reduction, while focusing on that the selected scheme is essentially fuel consumption neutral. Accordingly, by means of the present disclosure a further level of planning is introduced, whereby an indication of an upcoming reduction of an average speed for the vehicle, as compared to a generally planned speed for the vehicle (such as a current speed limit), is used for initiating activation of the selected and matching scheme for prevention of heat reduction at the EATS. The exhaust gas temperature may thus be kept at the desirable level, while keeping the fuel consumption at a minimum. Advantageously, such an implementation allows for an overall lower environmental impact for operating the vehicle.

The expression "essentially fuel consumption neutral" should, within the context of the present disclosure, be interpreted as not impacting negative as to an overall fuel consumption for the vehicle. Accordingly, the selection of the scheme for preventing heat reduction at the EATS is made taking into account an overall operation of the vehicle. Thus, even though the fuel consumption, from an instantaneous perspective, may slightly increase the overall fuel consumption should not. As such, the process of selecting a specific scheme takes an overall operation for the vehicle into account.

In line with the present disclosure, the scheme for preventing heat reduction at the EATS may for example be selected from a group comprising increasing an urea buffer level at a selective catalytic reduction system (SCR) comprised with the EATS, increasing a coolant temperature in a radiator comprised with the vehicle, activating an exhaust backpressure device comprised with the vehicle when reducing a speed for the vehicle, applying an inlet throttle scheme, applying a hot exhaust gas recirculation (EGR) scheme, and applying open waste-gate on a turbo comprised with the internal combustion engine.

Preferably, the control unit is arranged to select at least one scheme of a plurality of schemes for preventing heat reduction at the EATS. However, more than a single scheme may be selected, where the combined effect of e.g. two separate schemes may increase the prevention of heat reduction at the EATS. It is of course possible to use more than just two schemes for preventing heat reduction at the EATS.

The indication of the upcoming reduction of the average speed for the vehicle may in accordance to an embodiment of the present disclosure be based on Real Time Traffic Information (RTTI). Such RTTI data may for example be received from a remote server, for example using a network connection, such as the Internet. The RTTI data may alternatively be received using a radio connection. The general reception of the RTTI data allows for short planning periods as traffic jams, etc., may quickly appear or dissolved traffic jams. Accordingly, there is advantageous to ensure that the control unit is provided with the most up to date information to ensure that the most suitable scheme is selected to match the estimated heat reduction.

The determination of the estimated heat reduction may in line with the present disclosure also take into account a determined duration for the upcoming reduction of the average speed for the vehicle. Additionally, it may in some embodiments be suitable to control the duration for activating the selected scheme based on on the duration for the upcoming reduction of the average speed for the vehicle.

Furthermore, in line with the present disclosure it may be advantageous to not always activate a scheme for preventing heat reduction at the EATS, if it is determined that this will have no impact on the overall emission control for the vehicle. This may for example be applicable in case there is just an in comparison short expected reduction of the average speed for the vehicle.

Additionally, in line with the present disclosure it may also be possible for the control unit to take into account an ambient temperature at the vehicle, when determining if and which scheme to be used for preventing heat reduction at the EATS. That is, in case it is determined that the ambient heat is above a predetermined temperature threshold it may be possible to select a scheme that presents a slightly lower amount of heat reduction prevention as compared to a situation where the ambient temperature is lower than the predetermined temperature threshold.

According to another aspect of the present disclosure, there is provided an exhaust gas aftertreatment system (EATS) coupled downstream of an internal combustion engine comprised with a vehicle, the vehicle further arranged in communication with a control unit, wherein the control unit is arranged to receive an indication of an upcoming reduction of an average speed for the vehicle, determine, if the upcoming reduction of the average speed is above a predetermined speed threshold, an estimated heat reduction at the EATS based on the upcoming reduction of the average speed, select a scheme for preventing heat reduction at the EATS based on the estimated heat reduction, and activate, if the estimated heat reduction is above a predetermined heat threshold, the selected scheme, wherein the selected scheme for preventing heat reduction at the EATS is arranged to be essentially fuel consumption neutral. This aspect of the present disclosure provides similar advantages as discussed above in relation to the previous aspect of the present disclosure.

In line with the present disclosure, the control unit may in one embodiment be an electronic control unit (ECU) typically provided as an onboard component of the vehicle. However, at least one portion of the functionality of the control unit may in some alternative embodiments be performed using a remote server such as a cloud server, where the cloud server being network connected to an/the electronic control unit (ECU) comprised with the vehicle. That is, in such embodiment e.g. a fleet management function may be used for coordinating how the more than a single vehicle is to operate.

The exhaust gas aftertreatment system (EATS) presented above may in some embodiment be a component of a vehicle. Such a vehicle may in turn for example be at least one of a truck, a buss, a car and a working machine.

According to an additional aspect of the present disclosure, there is provided a computer program product comprising a non-transitory computer readable medium having stored thereon computer program means for controlling an exhaust gas aftertreatment system (EATS) coupled downstream of an internal combustion engine comprised with a vehicle, the vehicle further arranged in communication with a control unit, wherein the computer program product comprises code for receiving, at the control unit, an indication of an upcoming reduction of an average speed for the vehicle, code for determining, at the control unit and if the upcoming reduction of the average speed is above a predetermined speed threshold, an estimated heat reduction at the EATS based on the upcoming reduction of the average speed, code for selecting, at the control unit, a scheme for preventing heat reduction at the EATS based on the estimated heat reduction, and code for activating, at the control unit and if the estimated heat reduction is above a predetermined heat threshold, the selected scheme, wherein the selected scheme for preventing heat reduction at the EATS is arranged to be essentially fuel consumption neutral. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1A:
FIG. 1A illustrate a truck and 1B a bus in which an exhaust gas aftertreatment system (EATS) according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Referring now to the drawings and to FIG. 1A in particular, there is depicted an exemplary vehicle, here illustrated as a truck 100, in which the exhaust gas aftertreatment system (EATS) according to the present disclosure may be incorporated. The presently disclosed EATS may of course be implemented, possibly in a slightly different way, in a bus 102 as shown in FIG. 1B, a car, etc.

Figure 1B:
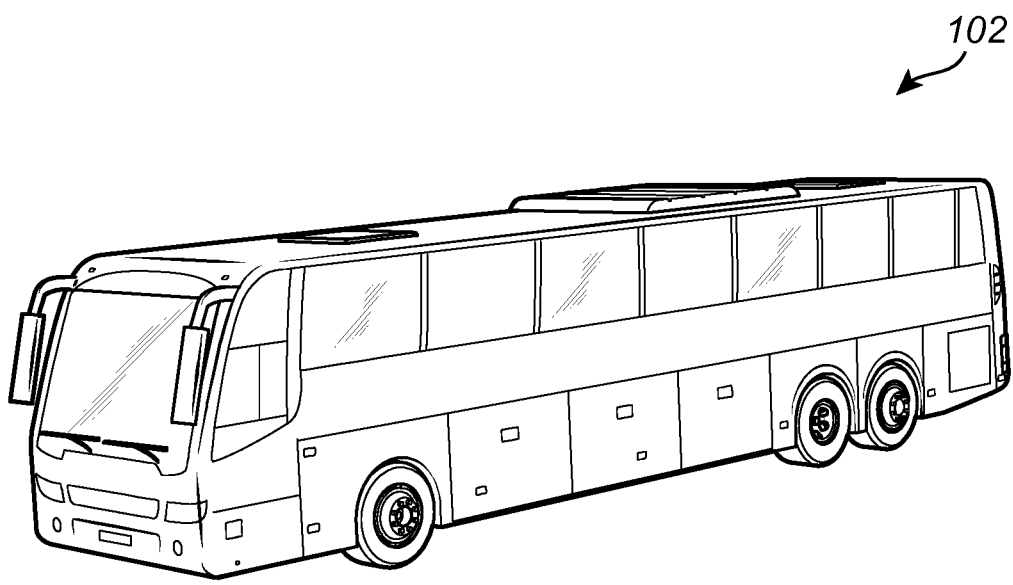
Figure 2:
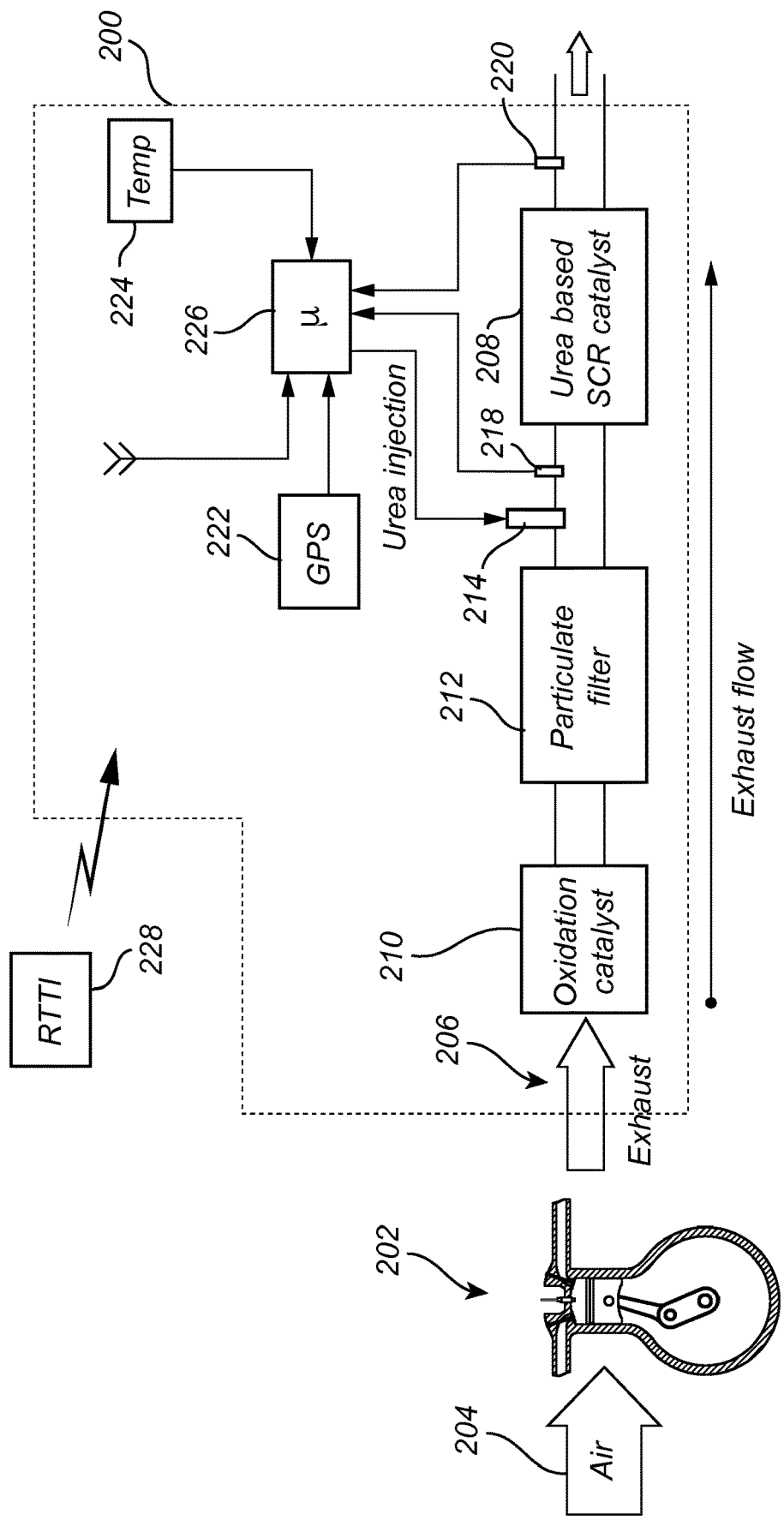
FIG. 2 conceptually illustrates an exhaust gas aftertreatment system (EATS) according to a currently preferred embodiment of the present disclosure, comprised as a component of propulsion means for e.g. the vehicles as shown in FIGS. 1A and 1B.

Turning now to FIG. 2, conceptually illustrates an exhaust gas aftertreatment system (EATS) 200 according to a currently preferred embodiment of the present disclosure, where the EATS 200 is arranged as a component of propulsion means for e.g. the vehicle 100 as shown in one of FIGS. 1A and 1B. The EATS 200 is arranged downstream of an internal combustion engine (ICE) 202, comprising a plurality of cylinders, one cylinder of which is shown in FIG. 2. The ICE 202 is shown as arranged in communicating with an air intake manifold 204 and exhaust manifold 206. The further components of the ICE 202 are excluded in FIG. 2.

The EATS 200 as exemplified in FIG. 2 comprises a urea based Selective Catalytic Reduction (SCR) 208, having an oxidation catalyst 210 and a particulate filter 212 coupled upstream of it. The SCR catalyst 208 may for example include a base metal/zeolite formulation with optimum NOx conversion performance in the range of 200–500° C. Reductant, such as aqueous urea, is stored in a storage vessel (not shown) and delivered to a reductant delivery system 214 coupled to exhaust manifold 206 upstream of SCR catalyst 208. The reductant is metered out by a pump through a control valve, where both the pump and the valve are controlled by a control unit 226. Air and reductant are injected into the reductant delivery system and are vaporized by the heated element, with the resulting vapor introduced into the exhaust gas mixture entering the SCR catalyst 208.

The EATS 200 further comprises two separate NOx sensors, where a first NOx sensor 218 is arranged upstream, and second NOx sensor 220 is arranged downstream of the SCR catalyst 208. Both the first and the second NOx sensor 218, 220 are coupled in the path of the exhaust gas entering and exiting the SCR catalyst. The outputs of these sensors 218, 220 are acquired by the control unit 226 and used for determining a NOx conversion efficiency of the SCR catalyst 208.

The oxidation catalyst 210 may for example be a precious metal catalyst, for example containing platinum, for rapid conversion of hydrocarbons (HC), carbon monoxide (CO) and nitrous oxide (NO) in the engine exhaust gas. The oxidation catalyst 210 may also be used for, during normal operation of the vehicle 100, 102, used to supply heat for fast warm up of the SCR catalyst 208, which is done by increasing the HC concentration in the exhaust gas entering the oxidation catalyst, where an exotherm is created when the extra HC is reduced over the oxidation catalyst.

The particulate filter 212 is coupled downstream of the SCR catalyst 208 and is used to trap particulate matter (such as soot) generated during the drive cycle of the vehicle 100, 102. The particulate filter 212 can be manufactured from a variety of materials including cordierite, silicon carbide, and other high temperature oxide ceramics.

The control unit 226 may for example be an electronic control unit (ECU), comprised with the vehicle 100, 102, possibly manifested as a general-purpose processor, an application specific processor, a circuit containing processing components, a group of distributed processing components, a group of distributed computers configured for processing, a field programmable gate array (FPGA), etc. The control unit 226 may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment, the memory is communicably connected to the processor (e.g., via a circuit or any other wired, wireless, or network connection) and includes computer code for executing one or more processes described herein.

The control unit 226 is arranged in communication with a geolocation arrangement, such as a GPS receiver 222 or a local positioning arrangement, such as for example a Wi-Fi positioning system. The control unit 226 is also connected to a temperature sensor 224; where the temperature sensor is used for acquire an indication of an ambient temperature at the vehicle 100, 102.

The control unit 226 is further arranged in communication with e.g. a remote server 226 for example by means of a radio or network communication 228 (such as e.g. the Internet). The remote server 226 is adapted to generate Real Time Traffic Information (RTTI) to be received at the control unit 226. The RTTI may for example comprise detailed traffic information in regards to the vicinity of the vehicle 100, 102, such as within the next 1000 meters, the next 2000 m, the next 5000 m (or more or less).

Figure 3:
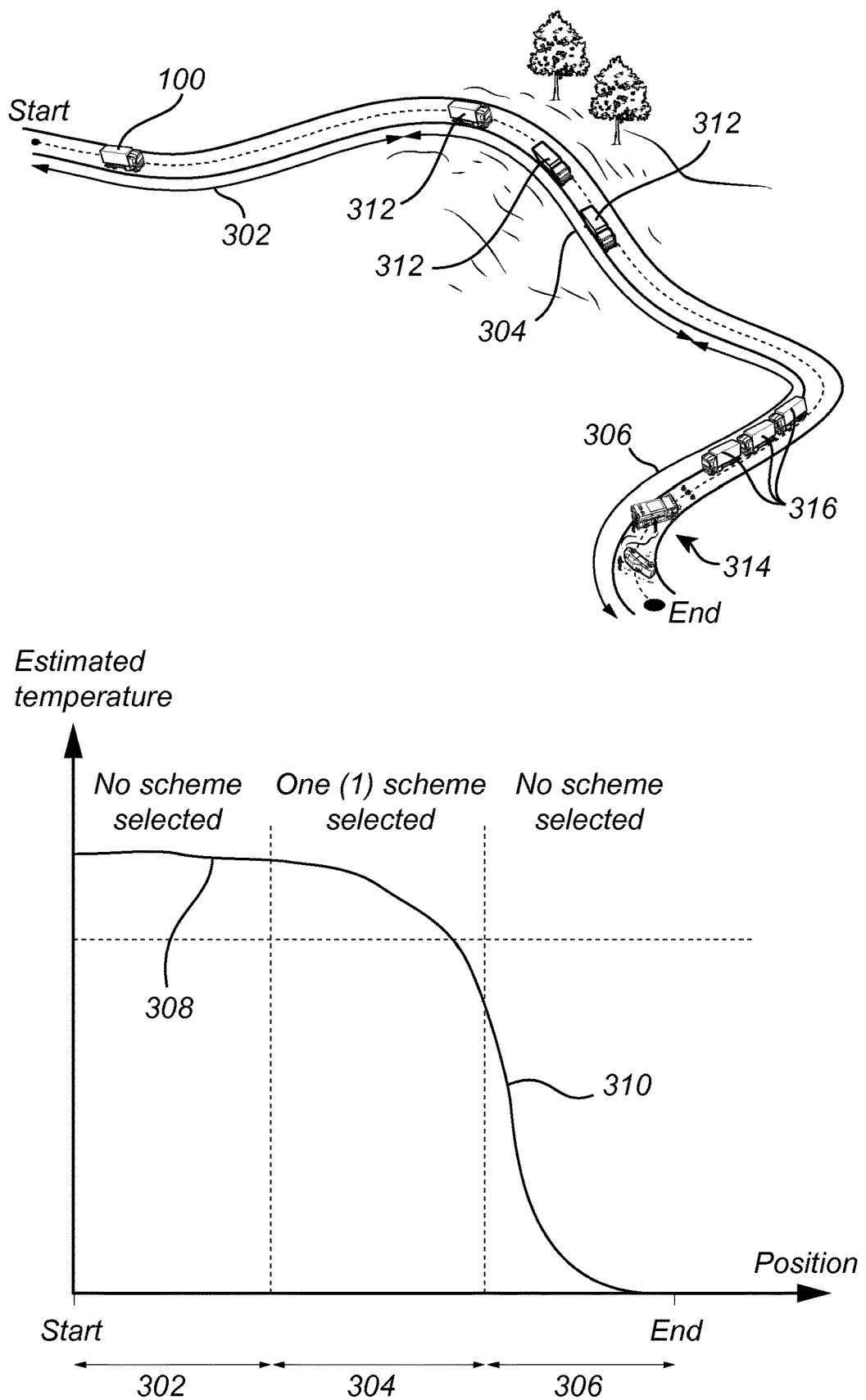
FIG. 3 provides an illustrative example of the operation of the EATS with the vehicle in line with the present disclosure.
Figure 4:
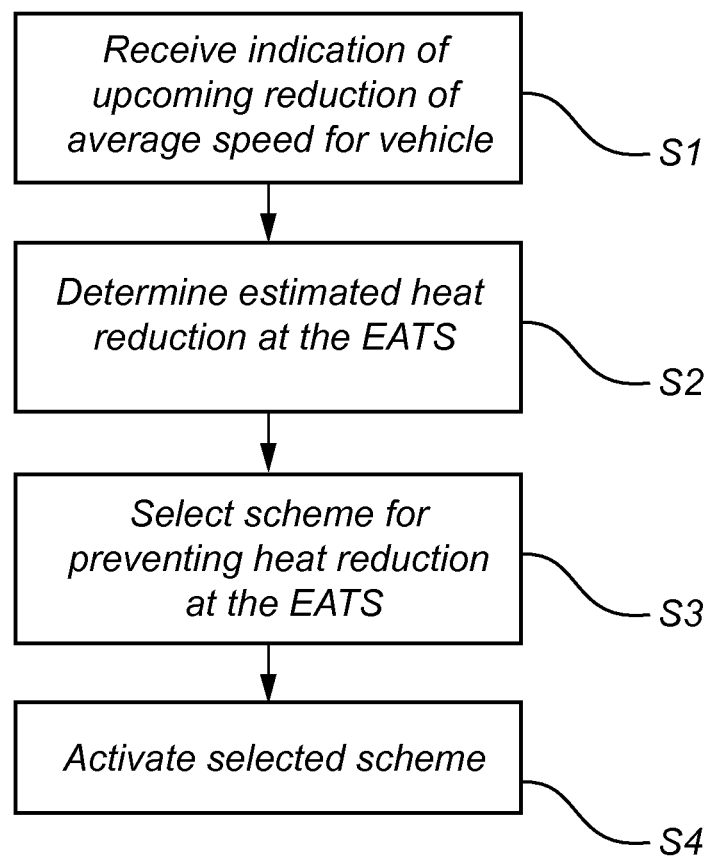
FIG. 4 shows a flow chart of a method according to an embodiment of the present disclosure.

During operation of the vehicle 100, 102, with further reference to FIGS. 3 and 4, the vehicle 100 is illustrated to be travelling along a route from a start position to an end position. The route is in the exemplifying drawings illustrated to comprise three separate segments 302, 304 and 306.

The first segment 302 is here illustrated as a segment where only a minor amount of further vehicles are present, thus indicating that the risk for a reduction of an average speed for the vehicle 100 is minimal. As a consequence, no indication of an upcoming reduction of an average speed for the vehicle 100 is thus received, and the temperature at the EATS 200 is determined to be steady, well above a predefined temperature threshold 308. The temperature at the EATS 200 is shown in FIG. 3 as a temperature curve 310.

However, at the second segment 304 the control unit receives, S1 an indication of an upcoming reduction of an average speed for the vehicle 102, as compared to a generally planned speed for the vehicle (such as a current speed limit), from the remote server 226. The information received from the remote server 226 indicates that there is an upcoming slight congestion of traffic ahead, including a plurality of vehicles 312 travelling below the speed limit within the second segment 304. In a preferred embodiment of the present disclosure the control unit 226 correlates a current location of the vehicle 100 with the information received from the remote server 226, for determining when (exactly) the upcoming slight congestion of traffic is to be expected.

Based on the received information, the control unit 226 determines, S2, that the upcoming reduction of the average speed will be above a predetermined speed threshold (for example by 5-15 km/h) resulting in an estimated heat reduction at the EATS 200 based on the upcoming reduction of the average speed, whereby the temperature curve 310 at the second segment 304 is shows as starting to fall below the predetermined temperature threshold 308. The control unit 226 may, in some embodiments, take into account the ambient temperature at the vehicle, as received from the temperature sensor 224.

As a result of this determination, the control unit 226 selects, S3, a suitable heat preservation scheme. In the illustrated embodiment and again with reference to FIG. 2, the control unit 226 determines that the suitable heat preservation scheme is to increasing an urea buffer level at a selective catalytic reduction system (SCR) comprised with the EATS. In line with the exemplary embodiment of the present disclosure, the control unit 226 will thus as a consequence activate, S4, the reductant delivery system 214 coupled to the exhaust manifold 206 upstream of SCR catalyst 208, for increasing the urea buffer level. It should be understood that the control of the reductant delivery system 214 in regards to the amount of urea to be delivered may be allowed to be dependent on expected amount of heat reduction. I.e. an in comparison low heat reduction may result in a low additional amount of additional urea, whereas an in comparison larger heat reduction may result in a comparison larger amount of additional urea.

It should be understood that other or additional schemes may be used for achieving heat preservation at the EATS 200, such as including but not limited to increasing a coolant temperature in a radiator comprised with the vehicle 100, 102, activating an exhaust backpressure device comprised with the vehicle when reducing a speed for the vehicle, applying an inlet throttle scheme, applying a hot exhaust gas recirculation (EGR) scheme, and applying open waste-gate on turbo comprised with the internal combustion engine.

Turning now to the third segment 306 of the route to be travelled by the vehicle 100, as illustrated in FIG. 3. Within this third segment 306 the control unit 226 receives an indication that there is an upcoming traffic accident 314. Due to the traffic accident 314, the average speed for the vehicle is here expected to be close to zero. At the accident 314 a further plurality of vehicles 316 are to be expected, meaning that the duration for the unexpected stop for the vehicle 100 is expected to be in comparison large, e.g. as compared to a normal stop at a traffic light.

Conversely to the control unit's 226 operation at the second segment 304, the control unit 226 will now determine that the duration for the upcoming reduction of the average speed for the vehicle 100 is expected to be longer than predetermined time threshold. As a consequence, the control unit 226 determines that no heat preservation actions are to be taken, meaning that no heat preservation scheme is selected nor activated. As a result, the function of the EATS 200 is reduced, until the vehicle 100 is to be fully operational again and travelling at its expected average speed.

Once the vehicle 100 is starting to travel again, it may be possible to apply a EATS heat-up mode, for ensuring that the EATS 200 is quickly getting up to the desired temperature.

In summary, the present disclosure relates to a computer implemented method for controlling an exhaust gas aftertreatment system (EATS) coupled downstream of an internal combustion engine comprised with a vehicle, the vehicle further arranged in communication with a control unit, wherein the method comprises the steps of receiving, at the control unit, an indication of an upcoming reduction of an average speed for the vehicle, determining, at the control unit and if the upcoming reduction of the average speed is above a predetermined speed threshold, an estimated heat reduction at the EATS based on the upcoming reduction of the average speed, selecting, at the control unit, a scheme for preventing heat reduction at the EATS based on the estimated heat reduction, and activating, at the control unit and if the estimated heat reduction is above a predetermined heat threshold, the selected scheme, wherein the selected scheme for preventing heat reduction at the EATS is arranged to be essentially fuel consumption neutral.

Advantages following by means of the present disclosure include the possibility to maintain the exhaust gas temperature at the desirable level, while keeping the fuel consumption at a minimum. Advantageously, such an implementation allows for an overall lower environmental impact for operating the vehicle.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for controlling an exhaust gas aftertreatment system (EATS) coupled downstream of an internal combustion engine comprised with a vehicle, the vehicle further arranged in communication with a control unit, wherein the method comprises the steps of:
   receiving, at the control unit, an indication of an upcoming reduction of an average speed for the vehicle as compared to a planned speed for the vehicle,
   determining, using the control unit, a duration of the upcoming reduction of the average speed for the vehicle,
   determining, using the control unit and only if the upcoming reduction of the average speed is above a predetermined speed threshold, an estimated temperature reduction at the EATS based on the upcoming reduction of the average speed,
   selecting, at the control unit, a scheme for maintaining an exhaust gas temperature at a desired level to prevent a temperature reduction at the EATS based on the estimated temperature reduction, and
   only activating, using the control unit, the selected scheme if the estimated temperature reduction is above a predetermined temperature threshold and the duration for the upcoming reduction of the average speed for the vehicle is below a predetermined duration, wherein:
   the selected scheme for preventing temperature reduction at the EATS is arranged to be essentially fuel consumption neutral to not impact negatively to an overall fuel consumption for the vehicle,
   the control unit is arranged to automatically select at least one scheme of a plurality of different schemes for preventing the temperature reduction at the EATS, and
   the at least one scheme of the plurality of schemes is selected based on the duration for the upcoming reduction of the average speed for the vehicle.

2. The method according to claim 1, wherein the indication of the upcoming reduction of the average speed for the vehicle is based on Real Time Traffic Information (RTTI).

3. The method according to claim 1, wherein the selected scheme for preventing the temperature reduction at the EATS is selected from a group comprising: increasing an urea buffer level at a selective catalytic reduction system (SCR) comprised with the EATS, increasing a coolant temperature in a radiator comprised with the vehicle, activating an exhaust backpressure device comprised with the vehicle, applying an inlet throttle scheme, applying a hot exhaust gas recirculation (EGR) scheme, and applying open waste-gate on turbo comprised with the internal combustion engine.

4. The method according to claim 1, wherein the activation of the selected scheme is dependent on an ambient temperature at the vehicle.

5. The method according to claim 1, wherein the at least one scheme of the plurality of schemes is selected based on an ambient temperature at the vehicle.

6. The method according to claim 1, wherein more than one scheme is selected by the control unit.

7. The method according to claim 1, wherein a duration for activating the selected scheme is dependent on the duration for the upcoming reduction of the average speed for the vehicle.

8. An exhaust gas aftertreatment system (EATS) coupled downstream of an internal combustion engine comprised with a vehicle, the vehicle further arranged in communication with a control unit, wherein the control unit is arranged to:
   receive an indication of an upcoming reduction of an average speed for the vehicle as compared to a planned speed for the vehicle,
   determining, using the control unit, a duration of the upcoming reduction of the average speed for the vehicle,
   determine, only if the upcoming reduction of the average speed is above a predetermined speed threshold, an estimated temperature reduction at the EATS based on the upcoming reduction of the average speed,
   select a scheme for maintaining an exhaust gas temperature at a desired level to prevent a temperature reduction at the EATS based on the estimated temperature reduction, and
   only activate the selected scheme if the estimated temperature reduction is above a predetermined temperature threshold and the duration for the upcoming reduction of the average speed for the vehicle is below a predetermined duration, wherein:
   the selected scheme for preventing temperature reduction at the EATS is arranged to be essentially fuel consumption neutral to not impact negatively to an overall fuel consumption for the vehicle,
   the control unit is arranged to automatically select at least one scheme of a plurality of different schemes for preventing the temperature reduction at the EATS, and
   the at least one scheme of the plurality of schemes is selected based on the duration for the upcoming reduction of the average speed for the vehicle.

9. The EATS according to claim 8, further comprising a transceiver arranged to receive Real Time Traffic Information (RTTI), and the control unit is arranged to form the indication of the upcoming reduction of the average speed for the vehicle is based on the RTTI.

10. The EATS according to claim 8, wherein the control unit is an electronic control unit comprised on-board the vehicle.

11. The EATS according to claim 8, wherein the control unit is a cloud server arranged in networked communication with the vehicle.

12. The EATS according to claim 8, wherein the control unit is implemented using a cloud server being network connected to an electronic control unit (ECU) comprised with the vehicle.

13. A vehicle comprising an EATS according to claim 8.

14. The vehicle according to claim 13, wherein the vehicle is at least one of a truck and a working machine.

15. A computer program product comprising a non-transitory computer readable medium having stored thereon computer program means for controlling an exhaust gas aftertreatment system (EATS) coupled downstream of an internal combustion engine comprised with a vehicle, the vehicle further arranged in communication with a control unit, wherein the computer program product comprises:
   code for receiving, at the control unit, an indication of an upcoming reduction of an average speed for the vehicle as compared to a planned speed for the vehicle, code for determining, using the control unit, a duration of the upcoming reduction of the average speed for the vehicle, code for determining, using the control unit and only if the upcoming reduction of the average speed is above a predetermined speed threshold, an estimated temperature reduction at the EATS based on the upcoming reduction of the average speed, code for selecting, at the control unit, a scheme for maintaining an exhaust gas temperature at a desired level to prevent a temperature reduction at the EATS based on the estimated temperature reduction, and code for only activating, using the control unit, the selected scheme if the estimated temperature reduction is above a predetermined temperature threshold and the duration for the upcoming reduction of the average speed for the vehicle is below a predetermined duration, wherein:

the selected scheme for preventing temperature reduction at the EATS is arranged to be essentially fuel consumption neutral to not impact negatively to an overall fuel consumption for the vehicle, the control unit is arranged to automatically select at least one scheme of a plurality of different schemes for preventing the temperature reduction at the EATS, and the at least one scheme of the plurality of schemes is selected based on the duration for the upcoming reduction of the average speed for the vehicle.

\* \* \* \* \*